April 20, 1937.   S. R. SWISS   2,077,595
EDIBLE PRODUCT AND PACKAGE THEREFOR
Filed Feb. 26, 1934
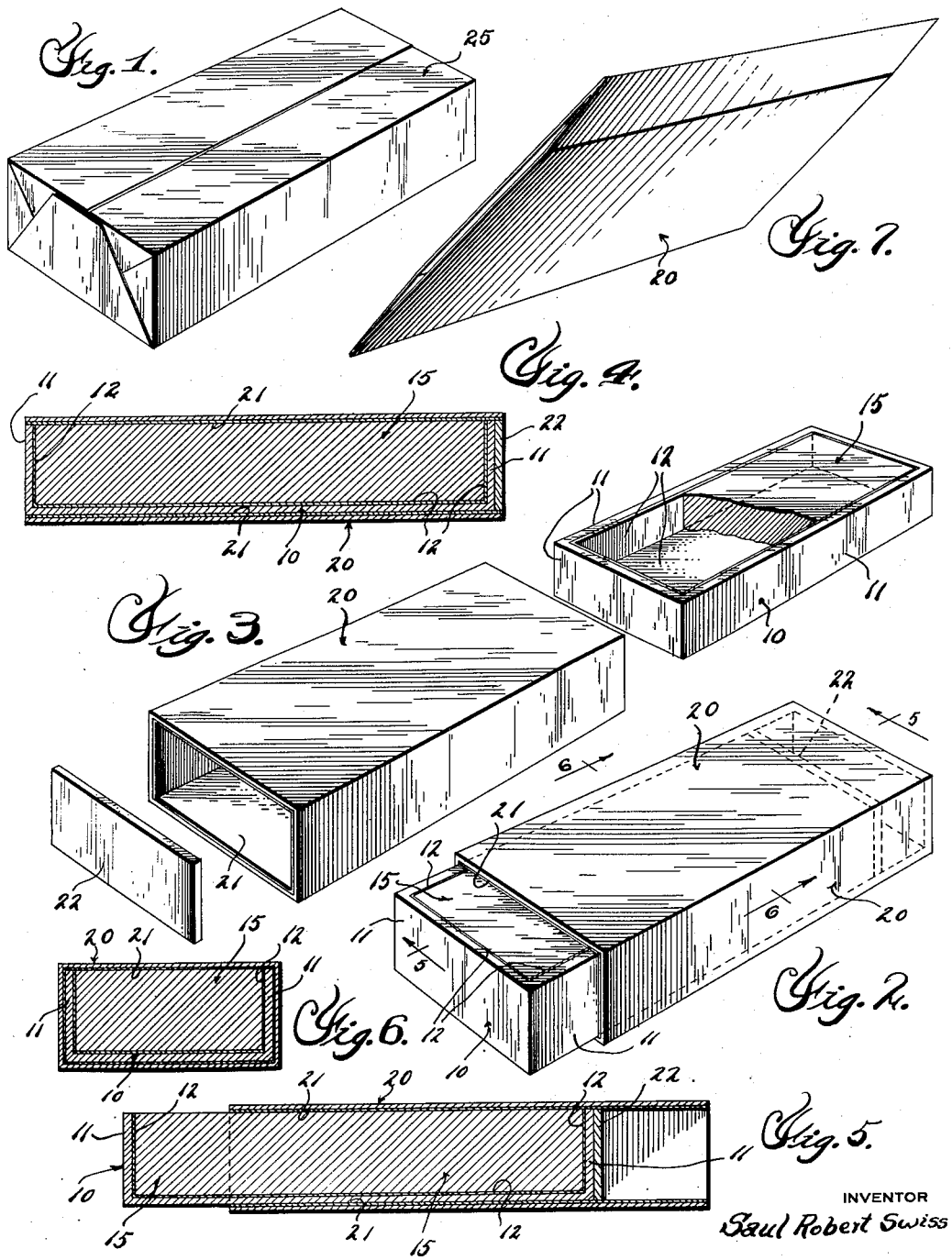
INVENTOR
Saul Robert Swiss
BY
ATTORNEY Patented Apr. 20, 1937

2,077,595

UNITED STATES PATENT OFFICE 2,077,595

EDIBLE PRODUCT AND PACKAGE THEREFOR

Saul Robert Swiss, Ottawa Hills, Ohio

Application February 26, 1934, Serial No. 712,974

10 Claims. (Cl. 99—180)

This invention relates to an edible product and to a means for packaging the same to facilitate handling thereof.

One of the primary objects of this invention is to provide means whereby an edible product can be transported, dispensed and even consumed in a convenient, economical and absolutely sanitary manner.

More particularly the invention provides an edible product so formed and packaged that the product need not be touched by hands subsequent to the manufacture and original wrapping of the same.

The invention provides further an edible product and a package for the same, which package includes means for holding the product during eating thereof, to prevent crushing of the product and to also prevent contact of the hands with the product.

The invention still further provides means for dispensing uniformly measured quantities of an edible product and means for insuring a minimum loss of the product through spillage, shrinkage, melting or the like.

Numerous other objects and advantages of this invention will become more apparent as the following description proceeds particularly when reference is had to the accompanying drawing, wherein Fig. 1 is a perspective view of an edible product formed and packaged in accordance with the teachings of this invention, the packaged product being encased in an outside wrapper;

Fig. 2 is a perspective view of the packaged product with the outside wrapper removed and the product partially ejected from its enclosing shell or housing;

Fig. 3 is a perspective view of the packaged product with the outside wrapper removed, the parts of the package and the edible product being shown in spaced relation to each other to more clearly disclose their structure;

Fig. 4 is a longitudinal sectional view through the packaged edible product with the outside wrapper removed;

Fig. 5 is a longitudinal sectional view taken on the line 5—5 of Fig. 2;

Fig. 6 is a transverse sectional view taken on the line 6—6 of Fig. 2; and

Fig. 7 is a perspective view of a portion of the package showing the same collapsed for the purpose of shipment.

For the sake of convenience, the invention will be described as being embodied in a packaged unit of ice cream although it is to be understood that in its broader aspects the invention contemplates the packaging of edible products other than ice cream.

Undoubtedly, the most popular way to dispense ice cream which is to be eaten away from the store or the like where it is dispensed, is in ice cream cones. The dispensing of ice cream in cones, however, possesses numerous disadvantages among which might be mentioned lack of cleanliness or sanitation due to the handling of the cone by both the dispenser and the party eating the same; the expense incident to breaking of the cones during their transportation to the stores where the cones are to be dispensed and during the handling and filling of the same by the dispenser, and the fact that it is practically impossible for the dispenser to accurately determine the actual cost of the dispensed cone because of the varying amounts of ice cream which may be placed in the cone. Even where care is taken by the dispenser, the amount of ice cream dispensed with each cone varies because of the variations in the hardness of the ice cream being dispensed.

The present invention contemplates the production of an edible unit which may be similar in many respects to an ice cream cone in that it may comprise a portion of ice cream of any desired flavor and a cake or like container for the ice cream, which container is similar in taste, consistency and appearance (other than shape) to the usual ice cream cone. Under the teachings of this invention, however, the numerous disadvantages incident to the old practice of dispensing ice cream in cones are eliminated, the invention providing for the dispensing of an accurately measured quantity of ice cream, the elimination of waste incident to breakage, and the elimination of the danger of contaminating the edible unit by contact with the hands of the dispenser or consumer.

Referring now particularly to the drawing wherein like reference characters designate corresponding parts throughout all views, the numeral 10 designates an edible tray or container. This tray may be suitably formed of any edible substance such as baked cake batter or dough and may be suitably flavored thus resembling in taste and consistency the usual ice cream cone. If desired, the tray may be formed of materials other than dough such as chocolate, candy or any tasty edible substance.

In Fig. 3 this container is clearly illustrated, a portion of the ice cream within the container being broken away to more clearly disclose the structure of the container or tray. While the tray may be of any size and shape, it is shown as being substantially oblong in plan and as having walls 11 rising to a suitable height so that the interior of the tray may receive the desired quantity of ice cream.

The tray is sufficiently rigid in texture and construction to resist distorting forces so that ice cream may be hardened in the same and the tray is preferably coated or lined on one or both sides with a suitable edible moisture proof material as designated by the reference character 12. The lining may be any desired substance such as, for example, oleo stearin, a casein product, glazed sugar caramelized or the like. This lining renders the tray more resistant to the effects of moisture and thus prevents the tray from becoming softened by the ice cream within the same.

As illustrated in Figs. 3, 4 and 5, the tray is completely filled with ice cream, this ice cream being designated by the reference character 15. In filling the tray it will be understood that the ice cream in a semi-plastic condition may be poured into the tray and then the tray and ice cream may both be placed in a hardening chamber wherein the ice cream is hardened in the tray to thus form a unit with the same. It will be understood that the ice cream may be of any desired flavor or flavors and that the tray likewise may be of any desired flavor to thus obtain a confection having practically any taste desired.

The numeral 20 designates a shell or holder adapted to snugly receive the ice cream filled tray. This shell 20 is substantially rigid, being formed of cardboard or the like. It is preferably lined as illustrated in Fig. 3 of the drawing with a moisture-proof material designated by the reference character 21, this material being paraffin or the like. It is to be understood that the rigid shell or housing 20 is open at its ends and is of a size to snugly receive the tray 10. By reference to Fig. 7 of the drawing it will be noted that the shell or housing is preferably so constructed that it may be collapsed to a substantially flat shape to thus facilitate shipping of quantities of these shells to the manufacturer who produces the packaged edible unit.

As brought out above, the shell or housing 20 is substantially rigid, being preferably formed of substantially stiff cardboard or the like. To further increase the rigidity of this shell or housing, there is preferably provided a partition 22 of a size to be slidably received within the shell as clearly illustrated in Fig. 5. It will be understood that when this partition is in place within the shell any forces tending to collapse the shell will be strongly resisted by virtue of the fact that these forces will be applied to the edges of the partition and would have to distort or break the partition rather than merely bend the same.

The tray 10 is of such a length that when the same is positioned within the housing 20, it terminates just short of one end thereof leaving just sufficient room to receive the partition 22 as clearly illustrated in Fig. 4 of the drawing. Thus before the edible unit is ejected from the shell, the whole interior of the shell is filled by the edible unit and the partition so that the unit comprising the shell, filled edible tray and the partition may be conveniently wrapped in a suitable Cellophane or like wrapper 25, this wrapper being sealed in any desired manner.

In manufacturing and using the packaged edible product above described, it will be understood that after the tray 10 has been suitably formed and lined, it will be filled with ice cream and the ice cream hardened therein so that the ice cream and tray constitute in substance a single edible unit. This unit will then be placed in the shell 20 as will also the partition 22. The whole unit thus produced will be enclosed in the wrapper 25 and the package then shipped to the store or the like where it is to be dispensed. It will be apparent that with the wrapper wholly enclosing the shell and edible unit, the edible unit may be transported and dispensed under absolutely sanitary conditions.

When a consumer purchases the packaged unit, he will of course, first remove the wrapper 25 thus exposing the shell 20. All but one end of the edible unit, however, will be still covered either by the shell or the partition 22. Thus the unit even with the wrapper removed may be held and handled by the consumer without touching the edible tray or its contents.

To eat the edible unit, the consumer will, of course, eject the same from the shell 20 this being accomplished by pressing on the partition 22. It will be apparent that the edible unit can be ejected as desired, so that even during the time the unit is being eaten the major portion of the same will be protected by the shell.

From the above it will be apparent that the invention provides an edible unit which may conveniently be an accurately measured quantity of ice cream and a cake or like container for the ice cream. The edible unit will be wholly protected from the time it is manufactured until it is consumed and will at no time be contaminated by being directly handled by either the dispenser or the consumer.

The shell which constitutes a part of the package will be sufficiently rigid to serve as a holder for the edible unit and to prevent crushing of the edible unit while the same is being eaten. Still further this shell will act as an insulating means to retard melting of the ice cream in the tray while the unit is being eaten.

It will be further apparent that the partition within the shell will tend to strengthen the shell to prevent collapsing of the same and that the size and rigidity of the partition may be varied as desired thus making it possible, if found desirable, to form the shell of fairly light weight cardboard, depending upon the strength of the partition rather than the rigidity of the cardboard of the shell to impart the desired rigidity to the shell. Still further the rigidity of the edible tray itself will help to reenforce the shell since it is snugly received in the shell.

As previously mentioned, the interior of the shell is preferably lined with a moisture-proof material such, for example, as paraffin. This lining serves not only to protect the edible unit from exterior moisture and the shell from the moisture of the edible unit but serves also to provide a smooth surface to facilitate ejecting of the filled tray from the shell. If desired, the outside of the shell may likewise be covered with a moisture proof coating to thus further protect the shell. While the shell has been described as being formed of cardboard, it is to be understood that the shell may be formed of any material whatever, the only requirement being that the shell be capable either alone or by virtue of its reenforcement by the inner partition of constituting a holder for the edible unit.

The edible unit is preferably, although not necessarily, made of a size to fit the mouth of the consumer thus further increasing the ease with which the edible unit may be eaten. There will, of course, be no waste of the ice cream through spillage or melting since the ice cream will be wholly contained within the edible container. The outer wrapper which as brought out before may be Cellophane, waxed paper or the like, provides a sealed enclosure for the shell and edible unit and protects the latter not only from contamination incident to handling, but also protects the ice cream from excessive loss through shrinkage and melting.

It might be noted that the actual commercial production of the packaged edible product may be accomplished either in the manner previously described or in any desired manner without departing from the spirit of the invention. For example, the tray might be inserted in the shell immediately after it is filled with the ice cream and the ice cream then hardened, the shell, tray and ice cream all being in the hardening chamber. Obviously, as a further modification, the unit might be wholly formed even to the extent of being enclosed in the outer wrapper and then the ice cream hardened by subjecting the complete unit to a suitable hardening operation.

While the invention has been described as being embodied in a packaged ice cream product, it will be readily apparent that the inventive principles may be utilized in the packaging of other food materials. Thus while one embodiment of the invention has been described with some detail, it is to be understood that the description is for the purposes of illustration only and is not definitive of the limits of the inventive idea, the right being reserved to make such changes in the details of construction, arrangement of parts, and the like as will fall within the purview of the attached claims.

What I claim as my invention is:

1. In combination an edible substance, a substantially rigid edible container for said substance, said container and substance together forming a unitary edible article, and a substantially rigid shell in which said edible article is telescopically fitted, said shell constituting a holder from which said edible article may be progressively ejected during eating thereof.

2. In combination a substantially rigid edible container, a quantity of ice cream filling said container and forming a unit with the same, and a substantially rigid open-ended shell in which said filled container is telescopically fitted, said shell constituting a holder from which said filled container may be progressively ejected during eating thereof.

3. In combination an edible substance, a substantially rigid edible container for said substance, a substantially rigid open-ended shell in which said edible container is telescopically fitted, and a partition slidably mounted in said shell adapted when moved longitudinally of said shell to eject the said edible container.

4. In combination a substantially rigid edible tray, a quantity of ice cream filling said tray and forming a unit with the same, a substantially rigid open-ended shell in which said filled tray is telescopically fitted, and a partition slidably mounted in said shell and adapted when moved longitudinally of said shell to eject said filled tray, said shell constituting a holder for said filled tray to prevent crushing and contamination of the filled tray during eating thereof.

5. In combination a tray formed of cake dough, a quantity of ice cream filling said tray and forming a unit with the tray, an open-ended substantially rigid shell in which said filled tray is mounted for telescopic movement, a partition slidably mounted in said shell and engageable with one end of said filled tray whereby movement of said partition longitudinally of said shell ejects the filled tray from the shell, and a wrapper enclosing said filled tray, shell and partition.

6. In combination a tray formed of cake dough, an edible moisture-proof lining for said tray, a quantity of ice cream filling said tray and forming a unit with the same, a substantially rigid shell in which said filled tray is telescopically fitted and from which said filled tray may be progressively ejected during eating thereof, said filled tray being normally housed wholly within the said shell, and a moisture-proof wrapping for the shell and filled tray.

7. In combination a substantially rigid edible tray, a moisture-proof lining for said tray, a quantity of ice cream filling said tray and forming a unit with the tray, a substantially rigid open-ended shell in which said filled tray is telescopically fitted, a moisture-proof lining for the interior of said shell, a partition mounted in said shell for movement longitudinally thereof, said partition being flush with one end of said shell and engaging the adjacent end of the filled tray and the other end of the filled tray being flush with the other end of the shell, and a moisture-proof wrapper for said shell and the filled tray and partition enclosed therein.

8. In combination a substantially rigid container formed of an edible substance, a frozen confection filling said container, and a shell snugly enclosing said container and from which said container may be progressively ejected.

9. In combination a tray formed of a baked dough, said tray being substantially box-like in shape and being open at its top, a quantity of a frozen confection filling said tray, and an open ended shell in which said filled tray is mounted for telescopic movement, the open ends of said shell providing for the progressive ejecting of the filled tray from the shell.

10. In combination, a substantially rigid edible tray, a quantity of a frozen confection filling said tray and forming a unit with the same, a substantially rigid open ended shell of a size and shape to snugly but telescopically receive said filled tray, and a partition mounted in said shell for movement longitudinally thereof, said partition being flush with one end of said shell and engaging the adjacent end of the filled tray and the other end of the filled tray being flush with the other end of the shell.

SAUL ROBERT SWISS.